Figure 1:
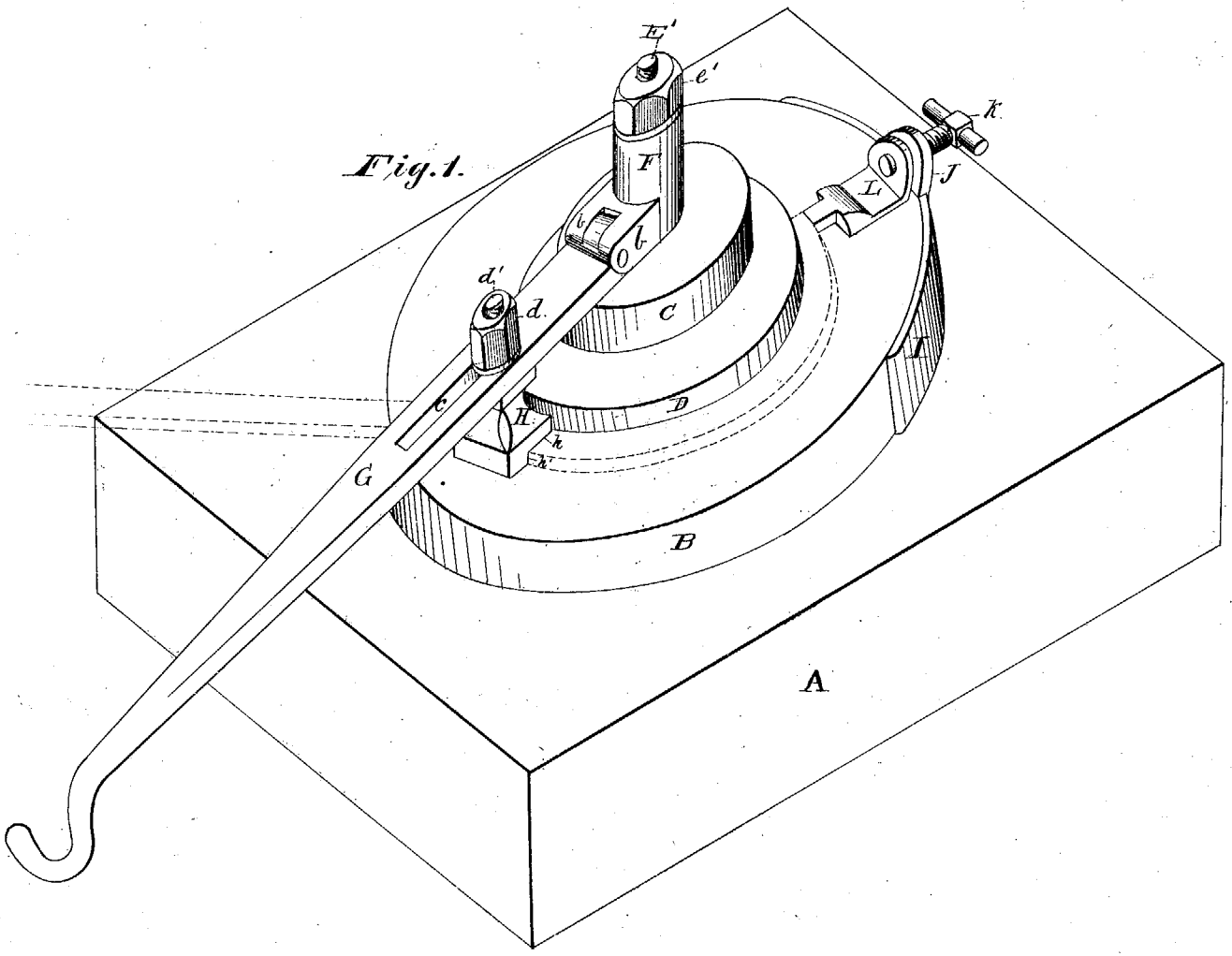

2 Sheets--Sheet 1.

CHARLES KIESER.

Improvement in Machines for Bending Fifth-Wheels.

No. 4,919. Reissued May 28, 1872.

Witnesses:

J. A. Lowder

H. C. Daniels

Inventor:

Charles Kieser, +
Emerson Ames, assignee
by G. H. + W. J. Howard, Attys.

AM. PHOTO-LITHOGRAPHIC CO. N.Y. (OSBORNE'S PROCESS.)

2 Sheets--Sheet 2.
CHARLES KIESER.
Improvement in Machines for Bending Fifth-Wheels.
No. 4,919. Reissued May 28, 1872.
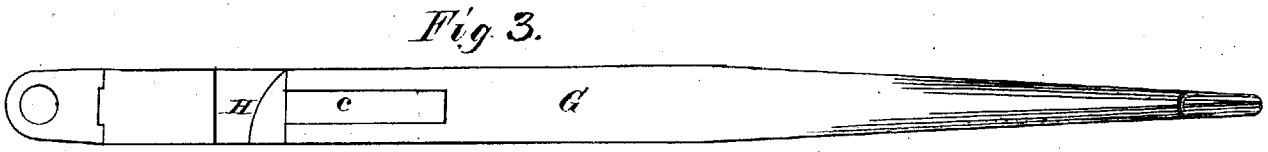
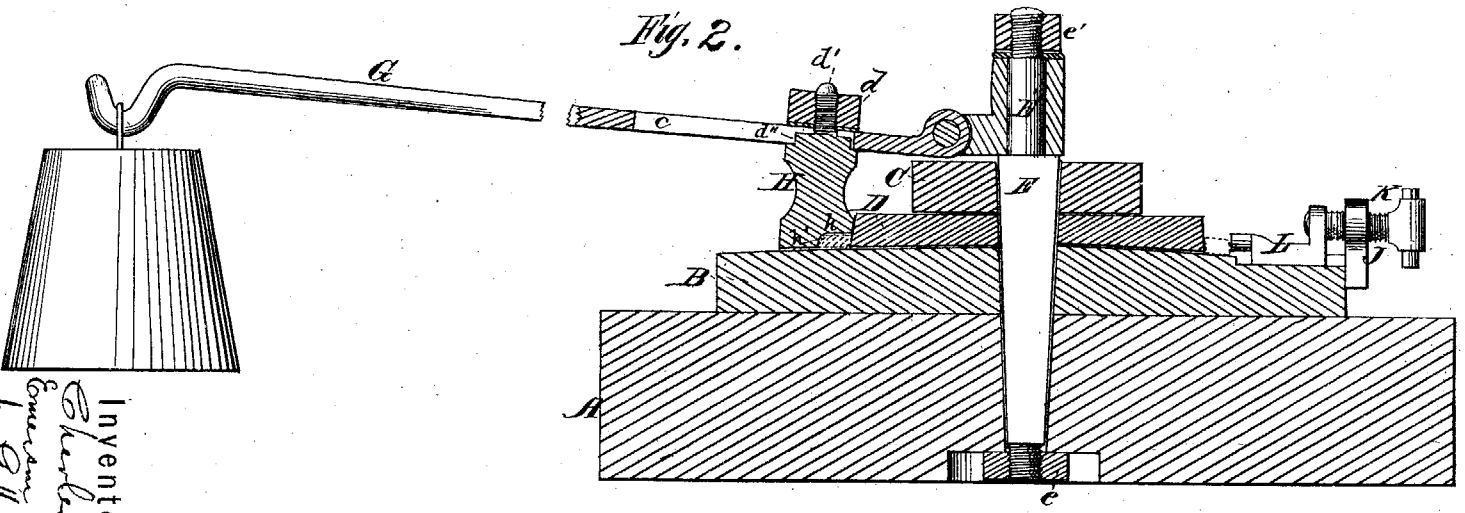
Witnesses:
L. E. Sleigh
D. E. Castle
Inventor:
Charles Kieser
Emerson Ames Assignee
per G. H. & W. J. Howard
Attys.
AM. PHOTO-LITHOGRAPHIC CO. N.Y. (OSBORNE'S PROCESS.)

UNITED STATES PATENT OFFICE.

CHARLES KIESER, OF BALTIMORE, MD., ASSIGNOR TO EMERSON AMES.

IMPROVEMENT IN MACHINES FOR BENDING FIFTH-WHEELS.

Specification forming part of Letters Patent No. 32,947, dated July 30, 1861; reissue No. 4,919, dated May 28, 1872.

*To all whom it may concern:*

Be it known that I, CHARLES KIESER, of the city of Baltimore and State of Maryland, have invented certain Improvements in Machines for Bending Fifth-Wheels for Carriages and other like-formed rings, of which the following is a specification; and I do hereby declare that the same is a full, clear, and exact description of my said invention, reference being had to the accompanying drawing and to the letters and figures of reference marked thereon.

My invention relates to a machine having for its specific object the avoidance of that difficulty ordinarily experienced in the bending of flat-rolled iron edgewise—for instance, in the shaping of fifth-wheels for carriages great difficulty has heretofore been found, and much labor at the hands of a skilled workman required, to produce an accurate form and perfect finish. One cause of trouble has been the tendency of the iron, when contracting and stretching at the inner and outer peripheries on the ring in the process of bending, to buckle upon the sides. Another difficulty to be met is that of the malformation produced in the part of the ring already curved by the curving of another part of the bar. To obviate these defects I provide means whereby the iron to be bent is firmly held against a fixed former of the desired curvature, by which its shape is preserved, the curving being effected by an adjustable former having suitable operating surfaces, which may be caused to revolve around the fixed former. The iron being held between the exterior surface of the fixed former and the operating surfaces of the adjustable former during the process of bending, all buckling or twisting of the ring is prevented, and a smooth and regular formation insured. In the further description of my invention which follows due reference must be had to the accompanying drawing, in which—

Figure 1 is a perspective view of my invention. Fig. 2 is a vertical axial section of the same. Fig. 3 is an under-side view of the radiating parts of the same.

Similar letters of reference indicate similar parts of the invention in all the figures.

A is the base of the machine, which may be constructed of cast-iron. B, D, and C are circular plates, also of cast-iron. E is a shaft, a square and tapering part of which passes through the base and respective plates B, D, and C at their centers, holding them together by means of the nut *e*. The part E′ of the shaft is round, and serves as a pivot for the revolving sleeve F, which is held to its position by the washer and nut *e′*. To the parts *b b* of the sleeve F is hinged a lever, G, the whole of which may be caused to radiate around and upon the shaft E as a common center. So far as relates to the mere bending of the bar, it would be effected just the same after it had been properly placed in relation to the table and bender, were the table to be revolved and the bender to remain stationary. H is a former having two operating surfaces, the horizontal one of which, *h*, rests upon the upper surface of the bar to be bent, the vertical surface *h′* coming into contact with the outer circumference of the ring. By means of the surfaces *h h′*, which may be either stationary or revolving to lessen the friction, operating with the upper surface of the disk B and the outer periphery of the plate D, the bar to be bent is securely and effectively clamped. The upper part of the former H is held within the slot *c* of the lever by means of the nut *d* upon the threaded end *d′*, and is prevented from twisting by the projection *d″* within the slot. The lever is thickened as it leaves its axis, the consequent taper assisting the nut *d* in preventing the outward slip of the former H. I is a strap fitted and secured to the outer circumference of the plate B, and provided with a swelled part, J, into which a set-screw, *k*, of any suitable length, is fitted. L is a clamp, dovetailed into the face of the circular plate B, connecting with the set-screw, by means of which it is moved radially in and out.

To illustrate the operation of my machine, I will suppose that it is desired to bend a fifth-wheel. The lever is first turned up out of the way, and the bar to be bent, having previously been cut to the proper length, is secured at one end by the clamp *k* L. The lever is then turned down and the former H placed so as just to pass over the end of the bar. By moving the lever around upon its pivot the bar is pressed around the periphery of the pattern-plate D, and thereby bent into the form of a ring with a flat surface, the inner diameter of which is equal to the outer diameter of the pattern-plate. All tendency of the wheel to twist or buckle is avoided by exerting a pressure upon the lever as it revolves. For this purpose a suitable weight is suspended from the hook at the end of the lever. The upper surface of the disk B, being of convex form, imparts a concavity to the under surface of the ring produced. At the same time the outer edge of the ring is swaged down by the operating surfaces of the former H, hereinbefore described. These results adapt the wheels to fit together in pairs, without the necessity of any after fitting by hand or otherwise. To permit the easy removal of the fifth-wheel when finished, the circular plate D is made of slightly smaller diameter at its upper side. Each ring, when formed, is released by retracting the clamp L and elevating the lever G, and may then be lifted off without any difficulty. Fifth-wheels or rings of different diameters can be made by changing the fixed former to that of the required size, and readjusting the former H without any disarrangement of other parts of the machine.

The principal merits of my machine are the following: It is cheap and simple. Its working parts are strong and serviceable, and easily replaced when worn. The work produced by it is finished, requiring no straightening, shaping, or smoothing afterward, only the welding of the ends of the bar remaining to be done. All the rings formed by the same formers are alike, and of the same size. The former H is secured against radial displacement by means simple and effective, and admits of ready adjustment; or it may be conveniently replaced by one of different shape, in order to produce rings of semicircular, hexagonal, or other desired section.

Having thus described my invention, what I claim as new, and desire to secure by Letters Patent, is—

1. The lever G, sleeve F *b b*, and former H having the two operating surfaces *h h'*, when used together, in combination with the common axis and the removable former D, substantially as and for the purposes herein specified.

2. The removable circular former D, convex plate B, clamping plate C, shaft E, and sliding clamp *k* L, in combination, all constructed and operating substantially as and for the purposes hereinbefore set forth.

CHARLES KIESER.

Witnesses:

C. A. WHEELER,

CHARLES H. BAKER.